United States patent office.

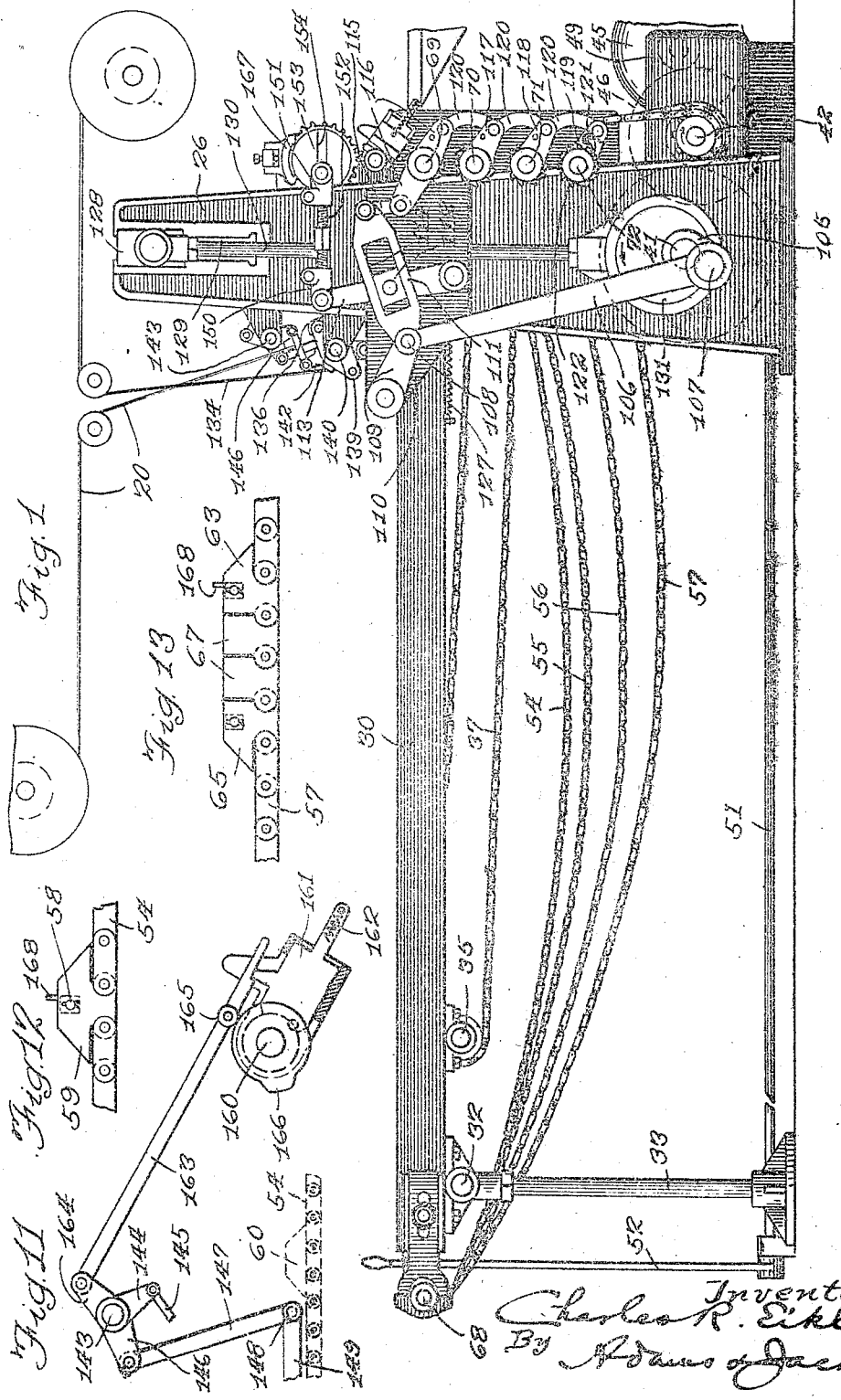

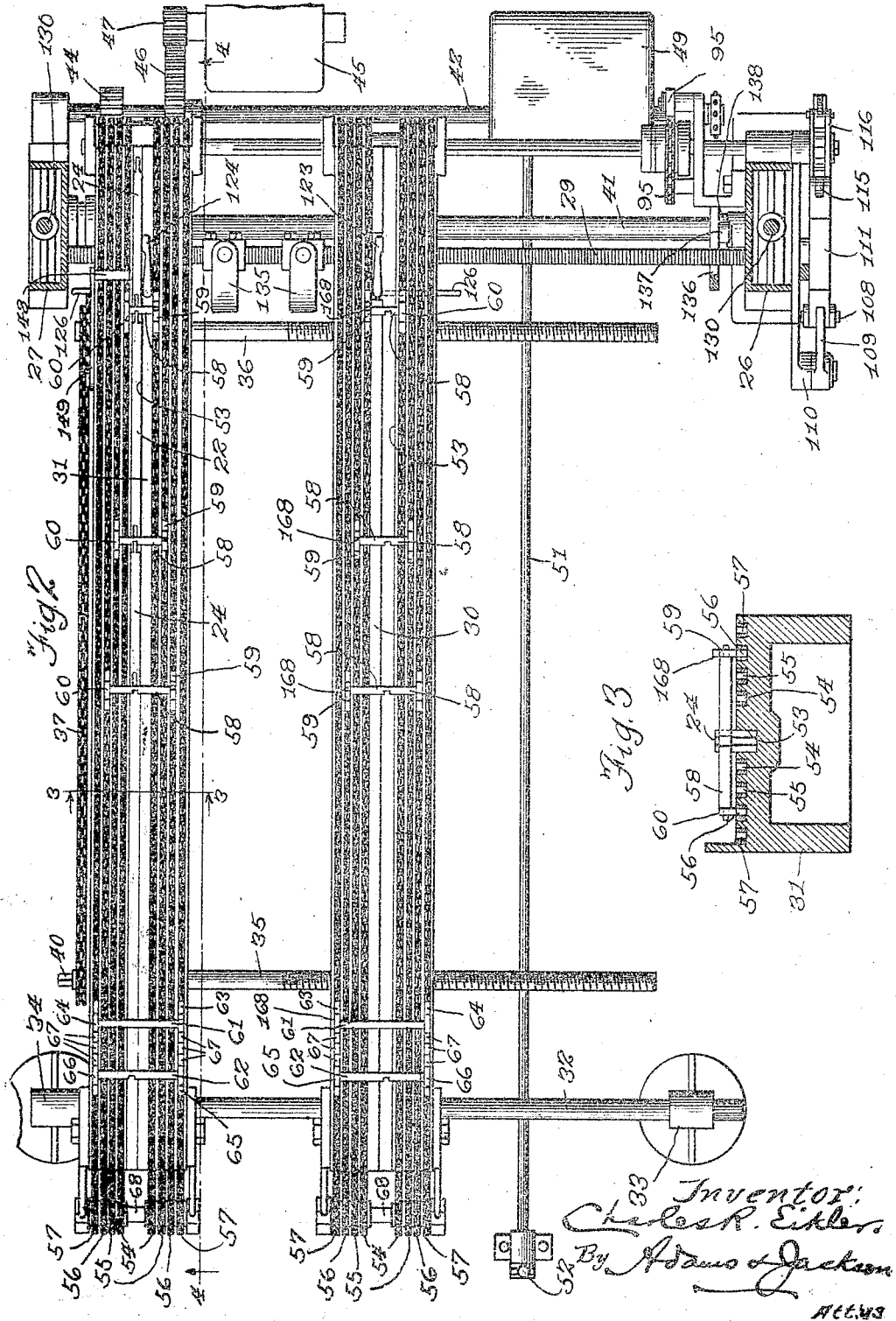

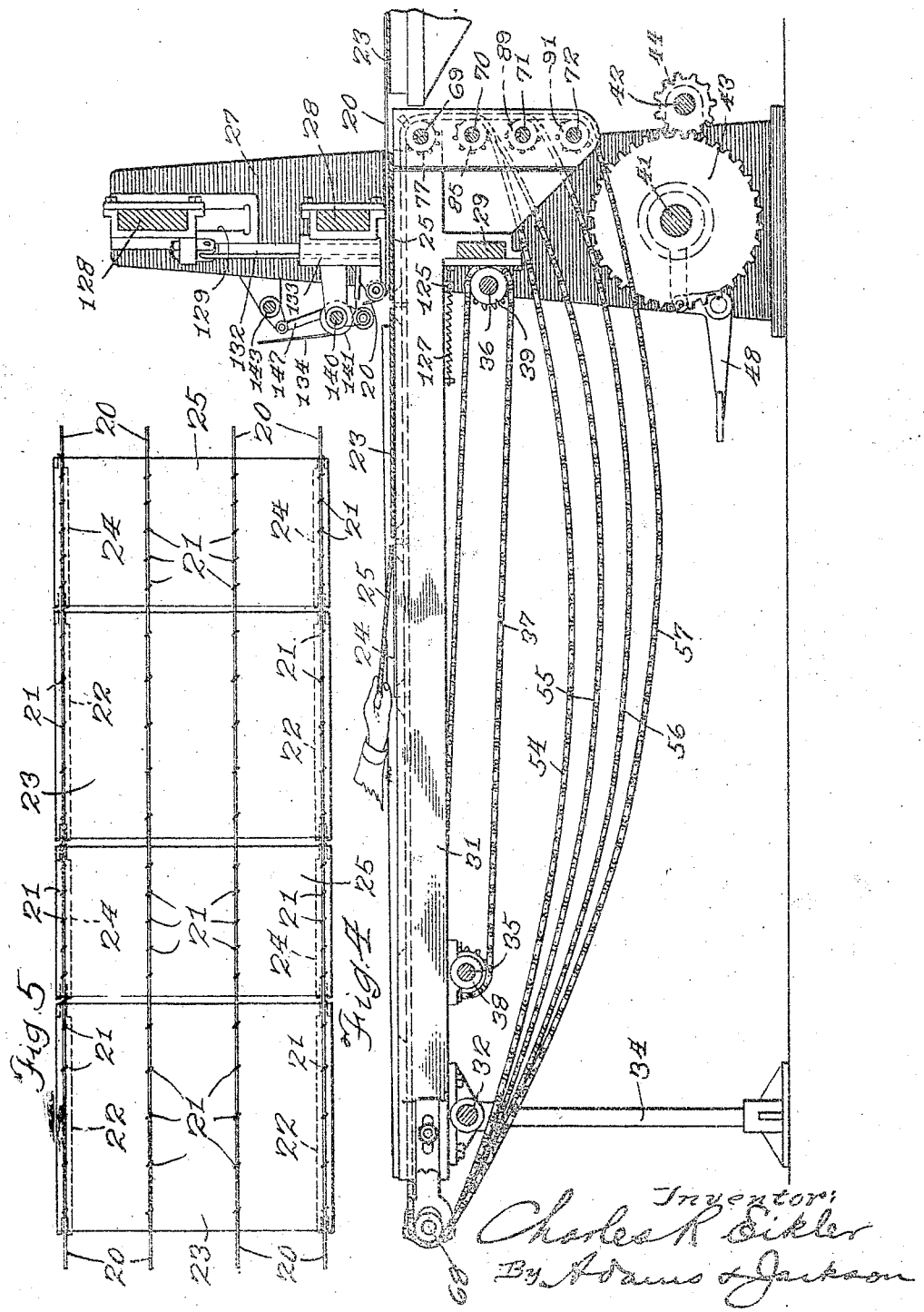

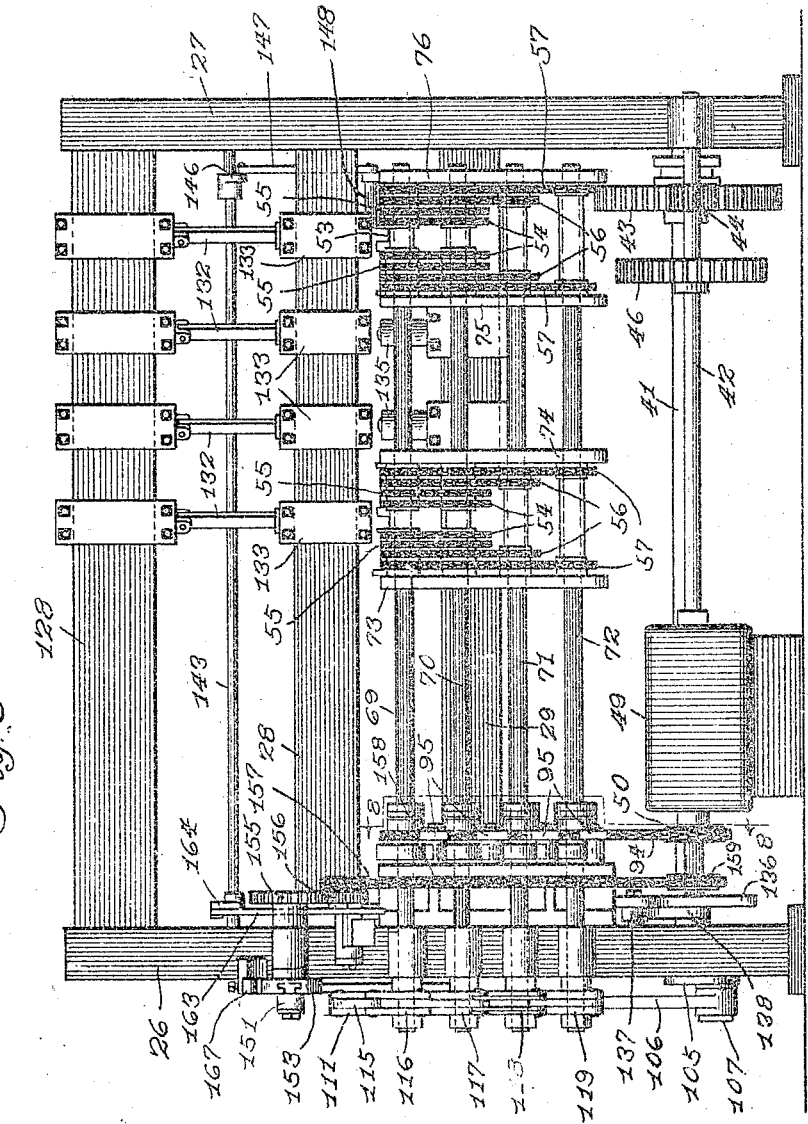

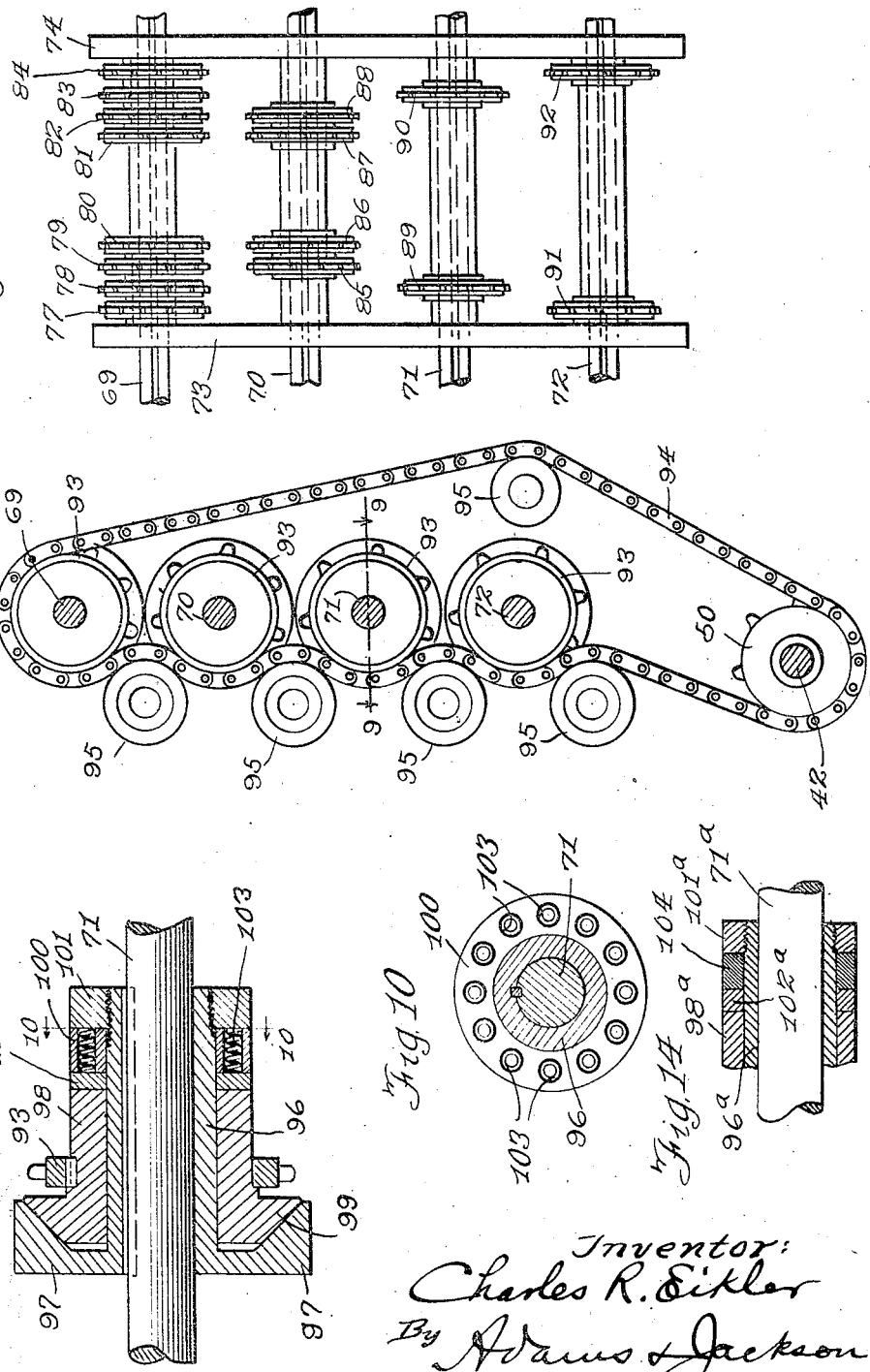

CHARLES R. EIKLER, OF CHICAGO, ILLINOIS, ASSIGNOR TO SPENCER J. JOHNSON, OF CHICAGO, ILLINOIS.

BOX-MAKING MACHINE.

1,198,708.

Specification of Letters Patent. Patented Sept. 19, 1916.

Application filed August 27, 1915. Serial No. 47,692.

*To all whom it may concern:*

Be it known that I, CHARLES R. EIKLER, a citizen of the United States, residing at Chicago, in the county of Cook, State of Illinois, have invented certain new and useful Improvements in Box-Making Machines, of which the following is a specification, reference being had to the accompanying drawings.

My invention relates to box making machines of the type shown in my application for Letters Patent of the United States, Serial No. 35,327, filed June 21, 1915, and it has for one of its objects the provision of new and improved means for feeding forward the cleats or strips for the formation of the box blank.

It is another object of my invention to improve machines of this type in sundry details hereinafter pointed out.

The preferred means by which I have accomplished these several objects are illustrated in the drawings and are hereinafter specifically described.

That which I believe to be new and desire to cover by this application is set forth in the claims.

In the drawings: Figure 1 is a side view of a box making machine embodying my improved construction; Fig. 2 is a top view, partly in section, of the machine shown in Fig. 1; Fig. 3 is an enlarged detail, being substantially a section taken on line 3—3 of Fig. 2; Fig. 4 is a longitudinal section through my machine, being a view taken substantially on line 4—4 of Fig. 2; Fig. 5 is a top view of a box blank of the type adapted to be formed by my improved machine; Fig. 6 is an end view of my improved machine as seen from the right in Figs. 1 and 4; Fig. 7 is an enlarged detail showing the arrangement of the sprocket wheels upon the driving shafts for driving the chains by which the cleats are fed forward; Fig. 8 is a view showing the arrangement of the means for transmitting motion to the driving shafts shown in Fig. 7, being substantially a section taken on line 8—8 of Fig. 6; Fig. 9 is a central section through one of the friction clutch mechanisms by which power is applied to the shafts of Fig. 7, the view being substantially a section taken on line 9—9 of Fig. 8; Fig. 10 is a section taken on line 10—10 of Fig. 9; Fig. 11 is a diagrammatic view showing the arrangement of the clutch mechanism and the parts for operating the same for procuring the desired change in the length of stitch between adjacent wide and narrow sides of the box blank; Fig. 12 is an enlarged detail showing the manner of mounting the cleat-forwarding devices upon the forwarding chains; Fig. 13 is an enlarged detail illustrating the form of cleat-forwarding mechanism carried by the forwarding chains for properly spacing adjacent box blanks relative to each other in the process of formation; and Fig. 14 is an enlarged detail, being a central vertical section through a modified form of structure corresponding to a portion of the showing of Fig. 9.

In Fig. 5 of the drawings is illustrated the form of box blank which my improved machine is designed to form. It will be noted that the form of box blank here illustrated differs slightly from the form of box blank shown in Fig. 5 of my former application above referred to, but it will be understood that the present machine is capable of being arranged to form either the blank illustrated in Fig. 5 of the present drawings or the blank illustrated in Fig. 5 of the former application. The blank shown in the present drawings is made up of four sections each comprising two cleats or strips spaced apart and joined by a sheet or board, the four sections being joined together by binding wires 20 secured to the boards by staples 21. The adjacent sections forming the blank are different in size, the cleats and boards entering into the formation of the wider sections being indicated by the numerals 22—23, respectively, and the cleats and boards entering into the formation of the narrower sections being indicated by the numerals 24—25, respectively. The staples 21 by which the binding wires 20 at the ends of the sections are secured to the boards are of such a length as to pass well into the cleats or strips, while the staples 21 by which the intermediate binding wires 20 are secured to the boards are shorter, being adapted to pass through the boards and to have their ends offset or clenched.

My improved machine operates, generally speaking, in the same manner as does the machine of my former application, comprising means for forming and driving the staples 21, together with means for feeding step by step into proper position for the staple-driving operation the elements entering into the formation of the blank. The arrangement is such that the blank in the process of formation is advanced one step and one row of staples is driven for each complete revolution of the main driving shaft. As in my former machine, the elements making up the blank are fed forward by power applied to the cleats or strips 22—24, the binding wires being pulled forward by reason of their attachment to the cleats or strips.

The means for feeding the cleats or strips 22—24 forward at each side of the machine comprises four dogs or carrier-blocks which are adapted to be drawn forward intermittently by a plurality of endless chains which are given positive intermittent movements in unison. In the construction shown the cleats or strips 22—24 are moved forward along suitable slideways, two chains being provided for each dog, one upon each side of the slideway, each of the dogs being mounted upon and carried by its two chains. The dogs serve not only to forward the cleats but also to space them properly relative to each other for the formation of the desired blank. One of the dogs is of considerably greater length than the remaining three, the longer dog being employed for providing the proper spacing between successively-formed blanks so as to provide proper lengths of binding wire for tying purposes for securing the ends of the blanks together when folded into box form. The positive intermittent driving means for the chains of each dog comprises pawl and ratchet mechanism adapted to permit any two chains to travel at an increased rate of speed. Auxiliary driving means is provided adapted to drive the four chains of each two dogs which are arranged transversely opposite each other when such dogs are released from engagement with the blank in the process of formation for carrying such dogs from the front end of the machine to the rear end of the slideway for spacing and forwarding the corresponding cleats of the next-succeeding blank. This auxiliary forwarding means in the construction shown comprises frictional driving means which tends at all times to drive the chains at an increased speed relative to the positive intermittent driving, but which is effective only when the dogs are released from the blank. The arrangement is such that the frictional driving means automatically picks up and carries around the two oppositely-disposed dogs as soon as they are released from a blank, carrying the dogs forward at the increased speed by reason of the slipping of the positive driving pawl upon its ratchet, the frictional driving at increased speed continuing until the progress of the dog is stopped by reason of the dog being brought into contact with the rear end of a cleat placed in position in the slideway by an operator, the forward end of the cleat being in contact with the slower-moving blank. Means is provided for retarding the advance of the blank through the machine. In the construction shown such retarding means operates frictionally upon the cleats of the blank, serving to hold the blank against forward movement regardless of the pull of the high speed frictional driving means, but adapted to permit the forwarding of the blank by the positively-acting driving means.

Referring now to Figs. 1 to 13, in which corresponding parts are indicated by the same reference characters, 26—27 indicate standards joined by heavy cross-bars 28—29, the cross-bar 29 being preferably adjustable vertically upon the standards in any suitable manner. Two heavy side plates 30—31 are fixed at their forward ends upon the cross-bar 29, the plates at each side of the machine being preferably in the form of a channel as shown in Fig. 3. The rear end of the plate 31 is fixed upon a heavy supporting bar 32, and the rear end of the side plate 30 is slidably mounted upon said supporting bar 32, standards 33—34 of any suitable type being provided for supporting the bar 32 at its ends. Two transverse shafts 35—36 are revolubly mounted in the plate 31 and held against movement transversely of the machine, said shafts having screw-threaded connection with the plate 30. The said two shafts are connected by means of a sprocket chain 37 passing about sprocket wheels 38—39 whereby the two shafts are caused to rotate in unison. The shaft 35 is provided with a squared head 40 adapted to receive a suitable tool for turning the shaft whereby the side-plate 30 may be shifted laterally toward and from the side-plate 31 as may be desired.

In the construction shown, the main drive shaft 41 by which the blank-forwarding and staple-forming and driving mechanisms are driven is revolubly mounted between the standards 26—27 near their lower ends. Said shaft 41 is driven by another shaft 42 through the medium of intermeshing gears 43—44, the shaft 42 being driven by a motor 45 through the medium of intermeshing gears 46—47. A foot lever 48 and suitable clutch mechanism of any suitable type are provided for connecting the gear 43 with the shaft 41, the arrangement in the construction shown being such that the gear 43 is adapted to rotate the shaft 41 when the lever 48 is held in its lowered position, and the connection between the shaft 41 and the gear 43 is adapted to be automatically terminated when the downward pressure upon the lever 48 ceases. The shaft 42 is provided with speed changing mechanism of any suitable type located in the transmission box 49 whereby the sprocket wheel 50 may be driven at varying speeds relative to the shaft 42. The transmission mechanism in the box 49 is also provided with a suitable disconnecting clutch adapted to be operated through the medium of a rod 51 provided with a lever 52 at the rear end of the machine. Inasmuch as these devices are well understood in the art and form no part of my present invention, it is believed to be unnecessary to further describe or illustrate them herein.

Each of the side plates 30—31 is provided with a plurality of grooves in its upper face, in the construction shown each of said plates being provided with nine grooves, the central groove 53 serving as the slideway for the cleats or strips 22—24. In each of the four grooves on each side of the central groove 53 there is mounted one of the endless chains by which the forwarding and spacing devices are carried forward. Two chains 54 are provided in the innermost grooves adapted to coöperate with each other. Two chains 55 coöperate with each other. Two chains 56 are employed for forwarding a third spacing device, and two chains 57 coöperate with each other for carrying the fourth spacing device. Each pair of chains 54, 55 and 56 are operatively connected by means of carrier blocks 58 in the form of transversely-extending bars journaled at their ends in cam-shaped blocks 59—60 carried by the said chains. The outermost chains 57 are connected by means of a pair of spacing and carrier blocks 61—62 journaled at their ends in suitable blocks carried by the said chains. The blocks carried by the chains 57 at each side of the machine for supporting the transversely-extending bar 61 are numbered 63—64, respectively, and the blocks carried by the said chains for supporting the transversely-extending bars 62 are numbered 65—66, respectively. The links of the chain 57 between the blocks 63—65 and between the blocks 64—66 are provided with blocks 67, the outer faces of which are flush with the outer faces of the blocks between which they are located.

The chains 54, 55, 56 and 57 at each side of the machine are supported by suitable sprocket wheels mounted upon shafts 68 adjustably mounted upon the rear ends of the side plates 30—31. At their forward ends the chains 54, 55, 56 and 57 are supported by transversely-extending shafts 69, 70, 71 and 72. The shafts 69, 70, 71 and 72 are supported at one end by suitable bearings mounted upon the standard 26 and are suitably supported at their other ends and intermediately by heavy plates or brackets 73—74 carried by the side plate 30 and heavy plates or brackets 75—76 carried by the side plate 31. Mounted upon the shaft 69 between the plates or brackets 73—74 and between the plates or brackets 75—76 are two sets of sprocket wheels 77, 78, 79, 80, 81, 82, 83 and 84. Mounted upon the shaft 70 in like manner are two sets of sprocket gears 85, 86, 87 and 88. Upon the shaft 71 are two sets of sprocket gears 89—90, and upon the shaft 72 are mounted two sets of sprocket gears 91—92. The various sprocket wheels upon the said shafts 69—70—71—72 are spaced upon the several shafts in pairs, as illustrated in Fig. 7, for receiving and supporting the chains 54, 55, 56 and 57. The sprocket gears 77, 78, 79, 86, 82, 83, 84 and 87 are loosely mounted upon the various shafts, while the remaining sprocket gears 80, 81, 85, 88, 89, 90, 91 and 92 are adapted to rotate with the shafts upon which they are mounted respectively, all of the said gears between the brackets or plates 73—74 being slidable upon the several shafts to provide for the lateral adjustment of the side plate 30 as above described. By the arrangement above described the four chains 54 are adapted to be driven by the shaft 69; the four chains 55 are adapted to be driven by the shaft 70; the four chains 56 are adapted to be driven by the shaft 71; and the four chains 57 are adapted to be driven by the shaft 72.

The means for frictionally driving the shafts 69—70—71—72 comprises sprocket wheels 93 mounted upon the said shafts, as hereinafter described, which are connected by means of a sprocket chain 94 with the sprocket wheel 50 which is adapted to be driven at variable speed from the shaft 42 as above described. A plurality of idlers 95 are used in connection with said sprocket chain as best illustrated in Fig. 8. Each of the sprocket wheels 93 is mounted upon its shaft by means of a friction clutch mechanism. Such friction clutch mechanism comprises a sleeve 96 fixed upon the shaft having a head 97, one face of which is beveled as best shown in Fig. 9. The gear 93 is fixed upon a sleeve 98 which has a beveled annular portion 99 conforming to the shape of the adjacent portion of the head 97. A pressure-ring 100 is held by means of a collar 101 in effective engagement with the sleeve 98, in the construction shown a wearing-ring 102 being interposed between the pressure-ring 100 and the end of the sleeve 98. The collar 101 is mounted upon the end of the sleeve 96 by means of screw-threads so as to be adapted to be adjusted thereon. In the construction shown in Fig. 9, the pressure-ring 100 comprises a sleeve provided with a plurality of openings therethrough containing compression coiled springs 103. As will be readily understood, the pressure of the springs 103 will be transmitted through the wearing-ring 102 to the sleeve 98, causing a frictional engagement between the beveled annular portion 99 of the said sleeve and the beveled head portion 97 of the sleeve 96. As will be readily understood, when power is applied to the sprocket gear 93 serving to turn the sleeve 98, considerable force will be applied tending to turn the sleeve 96 in the same direction.

In Fig. 14, which shows a modified form of structure, corresponding parts are indicated by the same reference characters, but with the addition of an exponent "a." In the construction here shown a pressure-ring 104 of rubber or other resilient substance is employed in place of the ring 100 and the springs 103, serving the same general purpose.

The means for positively driving the shafts 69—70—71—72 comprises a crank arm 105 mounted upon one end of the main driving shaft 41 having a link 106 pivotally connected thereto by means of a pin 107. The upper end of the link 106 is pivotally connected by means of a pin 108 with a swinging arm 109 pivotally mounted upon a heavy bracket 110 carried by the standard 26. The pin 108 serves also to connect a lever 111 with the arm 109 and the link 106. The lever 111 is provided with a slidable fulcrum block 112 which is pivotally mounted upon an arm 113 pivotally mounted upon the bracket 110, suitable mechanism hereinafter referred to being provided for holding the arm 113 in suitable position relative to the lever 111. The fulcrum block 112 is slidably mounted in a suitable slot 114 extending longitudinally of the lever 111. The forward end of the lever 111 is connected by means of a short link 115 with the rear end of a lever 116 which is journaled upon the extending end of the shaft 69. Levers 117, 118 and 119 are journaled upon the ends of the shafts 70, 71, 72, respectively. The forward ends of the levers 116, 117, 118 and 119 are pivotally connected together by means of links 120 whereby said levers are adapted to move in unison as the lever 111 is reciprocated about its fulcrum block 112 by the shaft 41 through the link 106. Each of the levers 116, 117, 118 and 119 is formed in two parts, one part of the lever 119 being broken away showing a spring pawl 121 pivotally mounted upon such lever in engagement with a sprocket wheel 122 fixed upon the shaft 72. Each of the levers 116, 117 and 118 is provided with a similar pawl 121 adapted to engage the ratchet wheel 122 upon the shafts 69, 70, 71, respectively, whereby upon the downward movement of the levers 116, 117, 118 and 119 the shafts 69, 70, 71 and 72 are rotated positively in unison in clockwise direction in Fig. 1.

As will be understood from an inspection of Fig. 1, the levers 116—117—118—119 will be moved downward during one-half of each revolution of the main driving shaft 41, being moved in the opposite direction during the remaining half revolution of said shaft. Inasmuch as the shafts 69, 70, 71 and 72 are all rotated at the same time and to the same extent, and inasmuch as the sprocket wheels upon said shafts by which the chains 54, 55, 56 and 57 are driven are all of the same size, it follows that the carrying and spacing blocks 58, 61 and 62 are upon the downward stroke of the said levers 116—117—118—119 moved forward positively precisely the same distances,—except as one or more of said carrying and spacing blocks are being moved forward at a more rapid rate by the auxiliary frictional driving means.

The means for preventing the forwarding of the box blank by the frictional driving means in the process of its formation comprises spring-pressed arms 123—124 mounted upon the side plates 30—31, respectively, adjacent to the grooves 53 in said side plates adapted to bear upon the sides of the strips or cleats 22—24 as they are forwarded along said grooves. Each of said arms 123—124 is pivotally mounted in one of the side plates of the machine by means of a downwardly-extending pin or shaft 125 (see Fig. 4). Upon each of the pins or shafts 125 is mounted an outwardly-extending arm 126 (see Fig. 2). Coiled springs 127 are connected to the arms 126 (see Figs. 1 and 4) tending to draw the arms 126 backward for swinging the arms 123—124 outward into frictional engagement with the cleats or strips 22—24 passing along the slideways of the side plates. The grip of the arms 123—124 upon the strips or cleats 22—24 is sufficient to prevent the box blank from being forwarded by the frictional driving means as above described, but is such as to permit the box blank to be forwarded by the positive driving means.

The means for forming and driving the staples 21 for securing the binding wires 20 in position in the formation of a box blank comprises a cross-head 128 slidably mounted in suitable slots 129 in the upper ends of the standards 26—27. The cross-head 128 is reciprocated up and down by means of connecting rods 130 pivotally connected at their upper ends to said cross-head and operatively connected at their lower ends with eccentrics 131 fixed upon the main drive shaft 41. The cross-head 128 is thus adapted to be given a complete inoperative upward stroke and a complete operative downward stroke upon each rotation of the shaft 41. The cross-head 128 is provided with a plurality of plungers 132 adjustably mounted upon the cross-head adapted to coöperate with suitable staple forming and driving devices 133 adjustably supported upon the cross-bar 28. For the formation of the blank shown in Fig. 5, four staple forming and driving mechanisms are employed together with four plungers 132. The staples 21 are adapted to be formed by the mechanism out of staple wires 134 which are adapted to be fed to the staple forming mechanism by the means hereinafter described, there being as many wires 134 as there are binding wires 20, as will be readily understood. A staple 21 is formed and driven upon each operative downward stroke of the cross-head 128, unless there has been a failure to feed the staple wires 134 to the staple-forming devices. In case of such a failure to feed the wires 134, the staple-forming and driving mechanisms pass through their several evolutions without having any effect upon the blank or upon the machine. Shoes or anvils 135 are adjustably mounted upon the cross-bar 29 for the intermediate staple driving devices 133 for the purpose of clenching the staples 21 for holding the intermediate binding wires 20 upon the boards 23—25. Inasmuch as the staple forming and driving mechanisms may be of any approved type, it is not believed to be necessary to further illustrate or describe them herein.

The means for feeding the staple wires 134 forward at the proper time comprises a bar 136 provided with a roller 137 bearing upon a suitable cam 138 carried by the main driving shaft 41 (see Fig. 6), the arrangement being such that the bar 136 (see Fig. 1) operates in proper timed relation on arm 139 mounted upon a transversely-extending shaft 140 for forwarding the wires 134 by suitable gripping rollers 141 (see Fig. 4) mounted upon said shaft. An arm 142 (see Fig. 1) is revolubly mounted upon the shaft 140 adapted by a movement in counterclockwise direction in said figure to throw out of operation the staple wire forwarding mechanism. Inasmuch as this staple forwarding mechanism and the means for throwing it out of operation forms no part of my present invention it is not believed to be necessary to further describe it herein. Preferably the mechanism is of the type disclosed in my previous application, Serial No. 35,327, above referred to, comprising a shaft 143 provided with a downwardly-extending arm 144 (see Fig. 11) which is pivotally connected by means of a link 145 with the upper end of the arm 142. The shaft 143 is also provided with a rearwardly-extending arm 146 which is connected with a downwardly-extending link 147 which carries at its lower end a stud or roller 148 (see Fig. 6) which extends over four of the chains 54—55—56—57. A link 149 serves to connect the lower end of the downwardly-extending link 147 with the side plate 31 as best shown in Fig. 2. As will be seen from an inspection of the diagrammatic view of Fig. 11, whenever one of the cam-shaped blocks 60 or 64 passes under the stud or roller 148 the link 147 is moved upward turning the shaft 143 in clockwise direction in Fig. 11, moving the link 145 backward and swinging the arm 142 in counterclockwise direction in Fig. 1 for throwing the staple wire feeding mechanism temporarily out of action. When the cam-shaped block 64 serves to raise the stud or roller 148, the blocks 67 and 66 serve to hold the roller in raised position thus preventing the feeding of the staple wire until another cleat 24 is in position to receive a staple.

As will be readily understood, the distance through which the forward end of the lever 111 is adapted to be moved when actuated by the uniform movement of the connecting rod 106 depends upon the position of the fulcrum-block 112 along the slot 114. As the fulcrum-block 114 is moved to the left in Fig. 1, the extent of the movement of the forward end of the lever 111 upon an actuation of said lever through the connecting link 106 will be increased, with a corresponding increase in the extent of rotation of the shafts 69, 70, 71 and 72, and a similar increase in the extent of movement of the chains 54, 55, 56 and 57, and the box blank carried forward by said chains. It is thus apparent that by adjusting the arm 113 the distance between staples along the binding wires 20 can be varied as desired. The means for adjusting the position of the arm 113 which carries the fulcrum-block 112 for bringing about a variation in the length of stitch comprises a socket member 150 pivotally connected with the upper end of the arm 113, a socket member 151 adapted to be held as hereinafter described, and a rod 152 having screw-threaded connection with said two sockets for drawing them together or for moving them away from each other. It will thus be appreciated that the length of stitch can be varied by an adjustment of the screw-threaded rod 152.

The means for automatically varying the stitch so as to have the staples 21 farther apart across the wide side of the box than across the narrower side comprises a rotatable plate 153 to which the socket 151 is pivotally connected, the connection of said socket member with the plate being adjustable toward and from the axis of rotation of the said plate by means of a slot 154. A gear 155 is provided rotatable with the plate 153. The gear 155 is driven by means of a gear 156 (see Fig. 6) which is adapted to be driven intermittently by a sprocket gear 157 which is driven continuously by means of a sprocket chain 158 working upon a sprocket wheel 159 mounted upon one end of the shaft 42. The connection between the sprocket wheel 157 and the gear 156 is such that the said gear 156 is adapted to be given only one complete revolution at each actuation thereof. The gear 156 and the sprocket wheel 157 are both mounted upon a shaft 160 (see Fig. 11). The clutch mechanism comprises a slide-block 161 which is provided with a spring 162 tending to hold it at the limit of its movement toward the shaft 160. The construction is such that when the block 161 is moved to the right in Fig. 11 connection is established between the sprocket wheel 157 and the gear 156. The clutch mechanism is such that at the end of a single complete revolution of the shaft 160 the connection between the sprocket wheel 157 and the gear 156 is broken as above set forth. Inasmuch as this clutch mechanism forms no part of my present invention and is formed substantially in accordance with the showing of my application, Serial No. 35,327, above referred to, it is believed to be unnecessary to describe it further in detail herein. The gear 156 is one-half the size of the gear 155, wherefore it follows that the rotation of the plate 153 is stopped upon each actuation at the end of a single half revolution. Inasmuch as the socket member 151 is connected eccentrically with the plate 153, it will be understood that the successive rotating movements of the said plate 153 serve to swing the arm 113 alternately to the right and the left, correspondingly decreasing and increasing the length of stitch of the binding wires 20.

The means for moving the block 161 to the right for throwing the clutch mechanism into operation is similar to that shown in my previous application, comprising a push-bar 163 connected with the end of an arm 164 carried by the shaft 143. Upon the upward movement of the link 147 by reason of the roller 148 being raised by the cam blocks 60—64, the bush-bar 163 will be given a movement to the right in Fig. 11 serving to move the block 161 to the right in said figure. It will be understood that when the cam block 64 raises the roller 148 the link 163 will be held in its forward position until the roller 148 has cleared the blocks 67 and 66. To prevent the push-bar 163 from holding the block 161 pushed to the right of Fig. 11, the said link 163 is provided with a roller 165 which is adapted to be engaged by a cam 166 rotatable with the shaft 160 for disengaging the push-bar 163 from the block 161. Thus the plate 153 is insured against being given more than one half revolution for any one actuation of the shaft 143 by one of the cam blocks 60—64.

The plate 153 is provided with a brake mechanism 167 of any suitable type for stopping the said plate at the end of its positive actuation.

The machine is adapted to operate in substantially the same manner as that of the machine of my former application. An operator near the forward end of the machine holds the foot lever 48 down so as to cause a continuous rotation of the main drive shaft 41 as desired. An assistant at the rear end of the machine places the cleats or strips 22—24 in the slideways at both sides of the machine. The operator at the forward end of the machine places the boards 23—25 in position upon the cleats 22—24 as the properly spaced cleats are intermittently fed forward as above described. Another assistant at the forward end of the machine cuts the binding wires 20 between the blanks after a sufficient number of rows of staples 21 have been driven into the new blank to hold the binding wires 20 against slipping relative to the new blank. The operator in placing the boards 23—25 in position upon the cleats brings the rear edges of the boards into contact with ears or lugs 168 extending upward in proper position from the blocks 59—63.

By reason of the pivotal mounting of the carrying and spacing blocks 58—62 upon the chains 54—55—56—57, the said blocks are adapted very readily to free themselves from engagement between the adjacent cleats 22—24 at the forward end of the machine. So far as I am aware I am the first in the art to provide for thus mounting the carrying blocks in a device of this type and my claims are to be construed accordingly.

What I claim as my invention and desire to secure by Letters Patent, is—

1. In a box blank making machine, the combination of a slideway along which cleats are adapted to be forwarded, spacing blocks adapted to space said cleats apart, and means for moving said spacing blocks for forwarding said cleats, said spacing blocks being arranged to turn on horizontal axes upon the parts of the forwarding means upon which they are mounted for disengagement directly downward from the cleats at the end of the forward movement of such spacing blocks.

2. In a box blank making machine, the combination of a slideway along which cleats are adapted to be forwarded for the formation of a blank, an endless chain adapted to revolve adjacent to said slideway, means for revolving said chain, and a spacing block pivotally connected with said chain and adapted to space apart two cleats in said slideway, said spacing block being adapted by its movement with said chain to forward said cleats along the slideway and being arranged at the end of its forward movement to turn relatively to said chain for sliding out of engagement with said spaced cleats.

3. In a box blank making machine, the combination of a slideway along which cleats are adapted to be forwarded for the formation of a blank, a pair of endless chains adapted to revolve on opposite sides of the slideway, means for revolving said chains in unison, and a spacing block journaled upon said two chains and adapted to space apart two cleats in said slideway, said spacing block being adapted by its movement with said chains to forward said cleats along said slideway and being arranged at the end of its forward movement to turn relatively to said chains for sliding vertically out of engagement with said two cleats.

4. In a box blank making machine, the combination of a slideway, a carrier block adapted to move a cleat along said slideway, an endless chain adapted to forward said carrier block, frictionally-acting means for driving said chain for moving said carrier block through a portion of its operative movement, a spring-pressed arm adapted to frictionally engage a cleat in said slideway serving to hold the cleat against forward movement by said frictionally-acting forwarding means, and positively-acting means for driving said carrier block.

5. In a box blank making machine, the combination of a slideway, a carrier block adapted to move a cleat along said slideway, an endless chain adapted to forward said carrier block, frictionally-acting means for driving said chain for moving said carrier block through a portion of its operative movement, an arm pivotally mounted adjacent to said slideway adapted to be swung into frictional engagement with the side of a cleat passing through said slideway, yielding means tending to move said arm into strong frictional engagement with said cleat whereby said frictionally-acting driving means is unable to forward said cleat, and positively-acting means for driving said carrier block.

CHARLES R. EIKLE.